US006046584A

United States Patent [19]
Nakane et al.

[11] Patent Number: 6,046,584
[45] Date of Patent: Apr. 4, 2000

[54] INTERNAL COMBUSTION ENGINE ROTATING POSITION DETECTOR USING A DIFFERENTIAL SIGNAL FROM MAGNETIC SENSING PORTIONS

[75] Inventors: Mitsutoshi Nakane, Hitachinaka; Ryoichi Kobayashi, Toukai-mura; Noriyoshi Urushiwara, Hitachinaka, all of Japan

[73] Assignees: Hitachi, Ltd, Tokyo; Hitachi Car Engineering Co., Ltd., Hitachinaka, both of Japan

[21] Appl. No.: 08/939,440

[22] Filed: Sep. 29, 1997

[30] Foreign Application Priority Data

Sep. 27, 1996 [JP] Japan .................................... 8-257123

[51] Int. Cl.[7] ............................... G01B 7/14; F02D 45/20

[52] U.S. Cl. ................................ 324/207.22; 324/207.25; 324/207.12

[58] Field of Search ......................... 324/207.12, 207.22, 324/207.2, 207.25, 173, 174, 225, 207.21; 338/32 R, 32 H

[56] References Cited

U.S. PATENT DOCUMENTS 5,729,127 3/1998 Tamura et al. ..................... 324/207.25
5,744,950 4/1998 Seefeldt ............................. 324/207.21

FOREIGN PATENT DOCUMENTS 1-240751 9/1989 Japan .

*Primary Examiner*—Walter E. Snow
*Attorney, Agent, or Firm*—Evenson, McKeown, Edwards & Lenahan PLLC

[57] ABSTRACT

A rotating position detecting device is capable of detecting a rotating position with high accuracy even if there exists variation in the air gap, and thereby capable of widening a detectable range of the air gap. A position of an irregularity on the detected rotating body is converted into a rectangular wave-form electric signal, and a rotating position of the detected rotating body is detected based on a building-up signal or a falling signal of the rectangular wave-form. The rotating position detecting device has a magneto-electric converter element for outputting an electric signal corresponding to a magnetic intensity, a magnet for generating a magnetic field, and a detected rotating body made of a magnetic material having the irregularity.

4 Claims, 5 Drawing Sheets

INTERNAL COMBUSTION ENGINE ROTATING POSITION DETECTOR USING A DIFFERENTIAL SIGNAL FROM MAGNETIC SENSING PORTIONS

BACKGROUND AND SUMMARY OF THE INVENTION

This application claims the priority of Japanese application 8-257123, the disclosure of which is expressly incorporated by reference herein.

The present invention relates to a rotating position detecting device using a magneto-electric converter element such as a Hall Effect element, and more particularly to an internal combustion engine rotating position detecting device for detecting a position of a crank angle internal combustion engine.

In the past, a rotating position detecting device using a magneto-electric converter element such as a Hall Effect element has been composed of a main body of a rotating position detecting device having a magnetoelectric element and a magnet for supplying a magnetic field to the magneto-electric element in a case and a detected rotating body having projections or grooves rotating together with a crank shaft of an engine. The main body of rotating position detecting device and the detected rotating body were arranged in opposite positions. Changes in magnetic flux density generated by rotation of the detected rotating body based on the shape of the projections or grooves on the detected rotating body were detected and formed in a rectangular wave-form by the main body of rotating position detecting device. A crank position was detected by measuring high level and low level time periods of the rectangular wave-form, and the measured result was used for control of the internal combustion engine.

FIG. 6 shows a known detected rotating body 3 in the conventional rotating position detecting device described above. The detected rotating body 3 had four projections 3*a* in the periphery, and a width $\theta_0$ of the projection 3*a* is detected for control of an internal combustion engine.

The lines (f)~(h) in FIG. 7 show change in magnetic flux density generated by rotation of the known detected rotating body 3 of FIG. 6 and rectangular signals detected based on the change in magnetic flux density. The line (f) shows the change in magnetic flux density A over time in the abscissa acting on the magneto-electric converter element. Referring to the line (f) of FIG. 7, the magnetic flux density Aa shows a state of magnetic flux density generated where a gap (hereinafter, referred to as "air gap") between the top front of the rotating position detecting device (the magneto-electric converter element) and the detected rotating body 3 is narrow, and the magnetic flux density Ab shows a state of magnetic flux density generated where the air gap is wide. The lines (g) and (h) in FIG. 7 show detected rectangular wave-forms B, C generated at the time when the generated magnetic flux densities Aa, Ab are at a threshold voltage $V_1'$. It can be understood from the lines (f), (g) and (h) that the generated magnetic flux density Aa or Ab varies when the air gap varies, and the width (period) of the detected rectangular wave-form $\theta_1$ or $\theta_2$ has a different shape when the threshold voltage V is kept constant. That is, FIG. 7 shows that the width of the detected signal wave-form $\theta_1$ or $\theta_2$ varies as the generated magnetic flux density Aa or Ab varies.

The prior art of controlling an internal combustion engine by detecting the high-level or low-level width (period) $\theta_1$ and $\theta_2$ of a rectangular wave-form as described above is disclosed, for example, in Japanese Patent Application Laid-Open No. 1-240751.

In the prior art rotating position detecting device using a magneto-electric converter element such as a Hall Effect element, variation in the air gap between the detected rotating body and the top front of the rotating position detecting device (the magneto-electric converter element) inevitably occurred due to an arrangement error caused by the construction of the device when the detected rotating body and the magneto-electric converter element are assembled.

Detecting the high level and the low level widths (time periods) $\theta_1$ and $\theta_2$ of the rectangular wave-form is equivalent to detecting the width of the projection or the groove of the detected rotating body. In the prior art, the difference in the gap between the top front of the rotating position detecting device (the magneto-electric converter element) and the detected rotating body, that is, the variation of the air gap was not taken into consideration, and as a result, the output signal of the rectangular wave-form undesirably varied because of the air gap. Accordingly, a crank angle (rotating position) could not accurately be detected.

The present invention has the objective of overcoming the above-mentioned problems. An object of the present invention is to provide a rotating position detecting device capable of detecting a rotating position with high accuracy even if a variation exists in the air gap between the detected rotating body and the magneto-electric converter element (the rotating position detecting device), and is capable of widening a permissible range of the gap variation.

In order to achieve the above-mentioned object, an internal combustion engine rotating position detecting device of the present invention comprises a magneto-electric converter element for output an electric signal corresponding to a magnetic intensity, and a magnet for generating a magnetic field. The internal combustion engine rotating position detecting device is characterized by a detected rotating body made of a magnetic material having an irregularity, and a position of the irregularity on the detected rotating body is converted into a rectangular wave-form electric signal. A rotating position of the detected rotating body is detected based on a building-up signal or a falling signal of the rectangular wave-form. Further, the internal combustion engine rotating position detecting device by detecting a width between building-up positions or falling positions of two rectangular wave-forms.

In one current embodiment of the present invention, the internal combustion engine rotating position detecting device employs a magneto-electric converter element in the form of a differential type element having a plurality of magnetic-sensing portions, and the irregularity of the detected rotating body is formed by projections or grooves.

Further, the internal combustion engine rotating position detecting device uses a number of the projections or the grooves arranged on the periphery of the detected rotating body equal to an amount of necessary information, and the projections or the grooves are arranged in a unit of an adjacent pair. In the internal combustion engine rotating position detecting device in accordance with the present invention having such a construction, the magnetic-sensing portion of the magneto-electric converter element and the projection or the groove of the detected rotating body repeat facing and not-facing by rotation of the detected rotating body. A magnetic field generated by the magnet is varied by repeated facing and not-facing, and the magnetic flux density acting on the magneto-electric converter element is varied by the change of the magnetic field. The change of the magnetic flux density is converted into a rectangular wave-form, and then a rotating position of the detected rotating body can be output as an electric signal by detecting building-up positions or falling positions of the two successive rectangular wave-forms.

Generated magnetic flux density is varied by variation of the air gap based on a spacing between a position of the magnetic-sensing portion of the magneto-electric converter element and a position of the projection or the groove of the detected rotating body, and the width (period) of the rectangular wave-form is varied by the variation of the generated magnetic flux density. However, a plurality of magnetic-sensing portions are provided in the magneto-electric converter elements, and a plurality of magnetic flux densities detected by the plurality of magnetic-sensing portions are calculated to bring a building-up position or a falling position of the rectangular wave-form to nearly the same position even if there is difference in the air gaps. Thereby, it is possible to detect positions unaffected or less effected by the air gap.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE PREFERRED EMBODIMENTS

Figure 1:
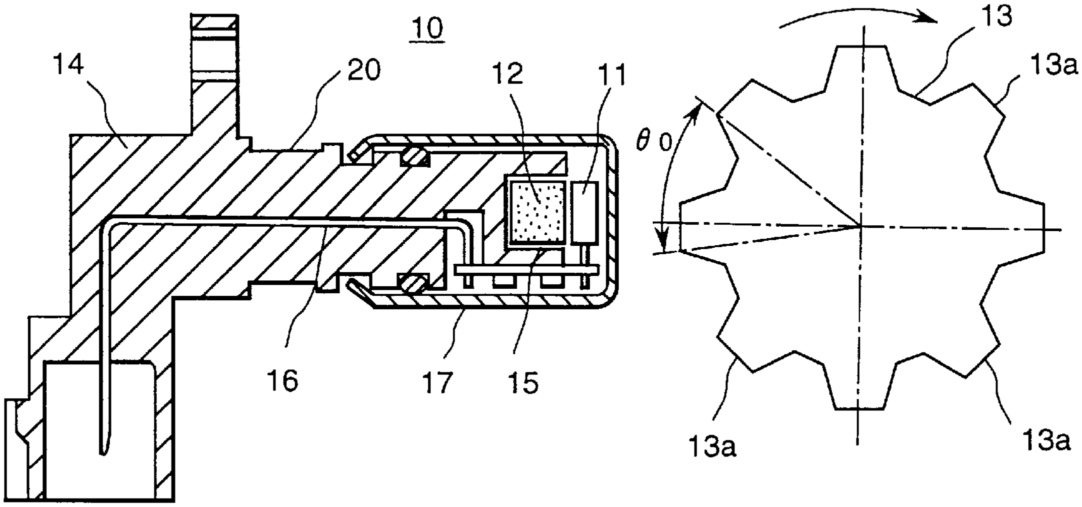
FIG. 1 is a cross-sectional view of an embodiment of a rotating position detecting device in accordance with the present invention and the detected rotating body.

FIG. 1 shows a rotating position detecting device 10 composed of a main body of rotating position detecting device 20 and a detected rotating body 13.

The main body of rotating position detecting device 20 contains a magneto-electric converter element 11 for outputting an electric signal corresponding to a magnetic intensity, a magnet 12 for supplying a magnetic field to the magneto-electric converter element 11 in a case 14, and a terminal 16 for electrically connecting a circuit board 15 having both an electric power supplying function to the magneto-electric converter element 11 and an input-output protecting function and the main body of rotating position detecting device 20 to an external source. A metallic cover 17 is made of a non-magnetic material, such as stainless steel, for protecting the magneto-electric converter element 11.

The detected rotating body 13 is rotated in synchronism with rotation of a crank shaft of an internal combustion engine. The detected rotating body 13 has projections arranged with a certain spacing, and number of the projections is equal to a number necessary for obtaining detected information, e.g., eight projections 3*a* in this embodiment. The main body of rotating position detecting device 20 and the detected rotating body 13 are attached and fixed to the internal combustion engine with an appropriate gap maintained between them.

As the detected rotating body 13 is rotated in synchronism with rotation of the crank shaft of the internal combustion engine, the magneto-electric converter element 11 of the main body of rotating position detecting device 20 and the projection 13*a* repeat alternately facing and not-facing. By repetition of facing and not-facing, the magnetic field generated by the magnet 12 is changed, and the change of the magnetic field causes a change in magnetic flux density acting on the magneto-electric converter element 11. Therefore, a rotating position of the detected rotating body 13 can be obtained as an electric signal by the main body of rotating position detecting device 20, and the electric signal is output from the terminal 16 through the circuit board 15.

Figure 2:
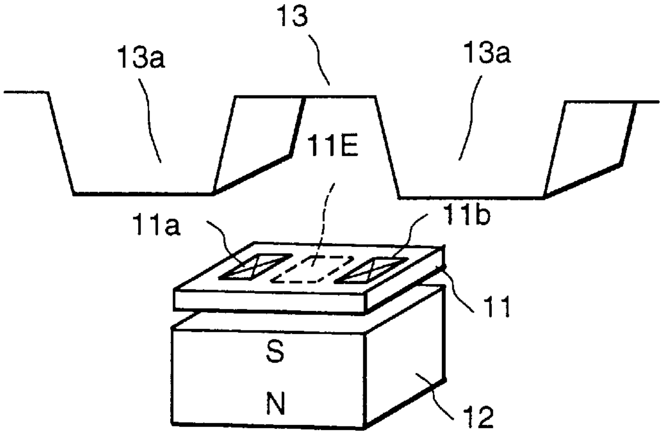
FIG. 2 is an enlarged perspective view of the detecting portion showing the magneto-electric converter element in the main body of rotation position detecting device and the detected rotating body in accordance with the present invention.

FIG. 2 is an enlarged schematic view of the detecting portion showing the magneto-electric converter element 11 of the main body of rotation position detecting device 20 and the detected rotating body 13, and shows the construction of a differential type magneto-electric converter element portion having at least two magnetic-sensing portions 11*a*, 11*b*.

Figure 3:
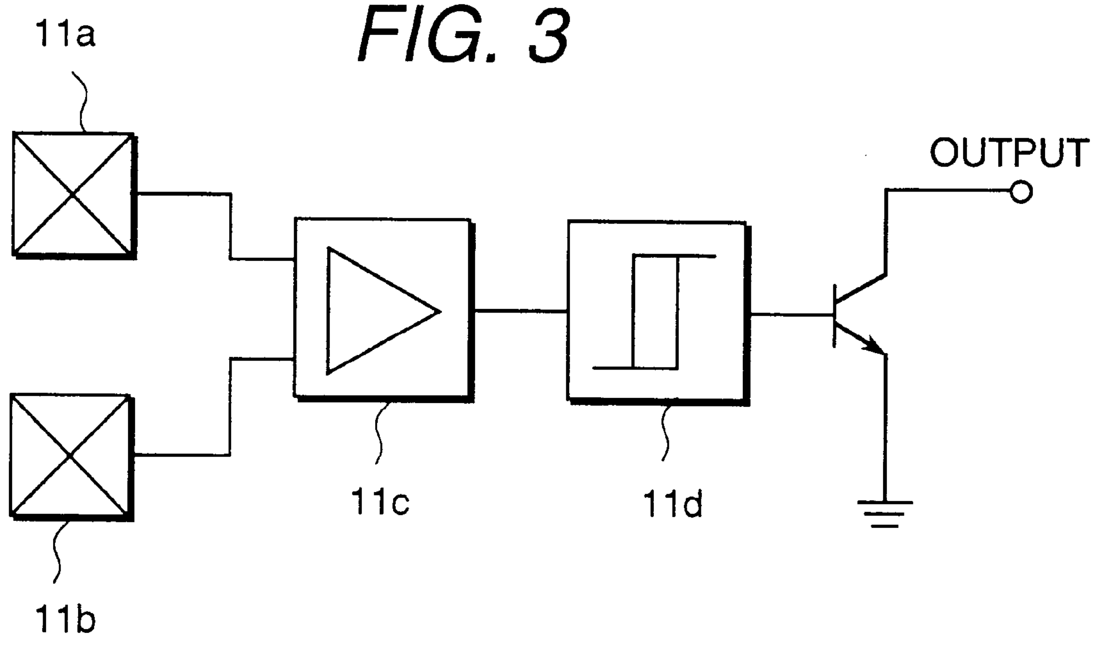
FIG. 3 is a schematic diagram showing the function of each part in the differential type magneto-electric converter element of FIG. 2.

In FIG. 3 the magnetic-sensing portions 11*a*, 11*b* respectively detect voltage values caused by a change of magnetic flux accompanied by rotation of the detected rotating body 13, a comparator 11C calculates the difference of the voltage values, and a Schmitt trigger circuit 11D wave-shapes the difference of the voltage values into a rectangular wave-form to output the external as a detected signal.

Figure 4:
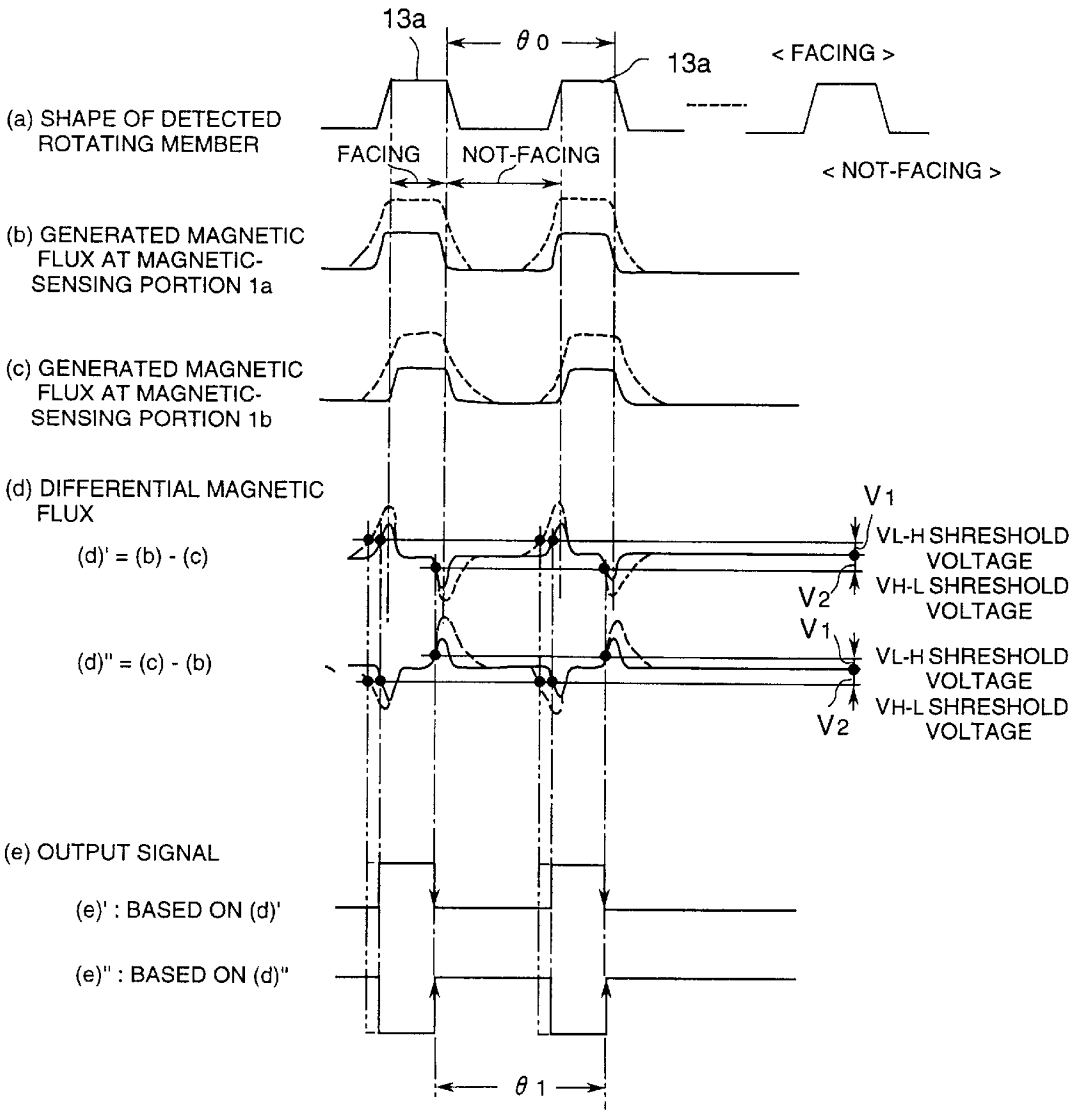
FIG. 4 is a chart showing the concept of operation of generated magnetic flux density and output wave-form of the rotating position detecting device of FIG. 2.

In FIG. 4, the horizontal axis indicates elapsing time, and the process of forming the rectangular wave-form of output signal is schematically shown starting from a magnetic flux density based on the shape of the detected rotating body 13.

FIG. 4(*a*) shows the projections 13*a*, 13*a* of the detected rotating body 13 arranged with a certain spacing. The projections 13*a*, 13*a* and the magnetic-sensing portions 11*a*, 11*b* repeat facing and not-facing positions by rotation of the detected rotating body 13. FIGS. 4(*b*) and (*c*) show applying states of magnetic fluxes (generated voltages after magneto-electric conversion) to the magnetic-sensing portions 11*a*, 11*b* of the magneto-electric converter element 11 based on the repeated facing and not-facing positions, and the solid lines and the dotted lines show the difference in the generated voltages caused by the air gap of positional spacing between the magnetic-sensing portions 11*a*, 11*b* of the magneto-electric converter element 11 and the projection 13*a* of the detected rotating body 13. The solid line shows a voltage wave-form in a case of a large air gap, and the dotted line shows a voltage wave-form in a case of a small air gap. It can be understood from FIG. 2 that since arranged positions of the magnetic-sensing portion 1*a* and the magnetic-sensing portion 1*b* are different from each other and accordingly their relative facing positions to the detected rotating body 13 are different, a time lag occurs in generation of the magnetic fluxes.

FIG. 4(*d*) shows a differential magnetic flux wave-form after the comparison calculation in the comparator 11C and threshold voltages $V_1$, $V_2$ of the differential magnetic flux wave-form in the Schmitt trigger circuit lid. The threshold voltage $V_1$ shows a threshold voltage for building-up wave-form $V_{L-H}$, and the threshold voltage $V_2$ shows a threshold voltage for falling wave-form $V_{H-L}$.

FIG. 4(*d*)' is a differential magnetic flux obtained by subtracting the magnetic flux (c) of the magnetic-sensing portion 1*b* from the magnetic flux (b) of the magnetic-sensing portion 1*a*, and FIG. 4(*d*)" is a differential magnetic flux obtained by subtracting the magnetic flux (b) of the magnetic-sensing portion 1*a* from the magnetic flux (c) of the magnetic-sensing portion 1*b*.

FIG. 4(*e*) shows output signals of rectangular wave-form formed based on the threshold voltages $V_1$, $V_2$ of the differential magnetic flux wave-form. FIG. 4(*e*)' is a rectangular wave-form based on the differential magnetic flux (d)' and FIG. 4(*e*)" is a rectangular wave-form based on the differential magnetic flux (d)". The rectangular wave-form (e)' and the rectangular wave-form (e)" are in a reversed wave-form to each other. (However, by reversing the signals in output terminal using a transistor or the like, both wave-forms are reversed.)

What should be noticed here is that, in the generated signals of the rectangular wave-form (e)', a positional difference occurs in the building-up positions of the rectangular wave-forms based on the difference of the generated magnetic flux (the solid line and the dotted line of the generated magnetic fluxes (b) and (c)) due to the air gap of the positional spacing between the magnetic-sensing portions 11*a*, 11*b* of the magneto-electric converter element 11 and the projection 13*a* of the detected rotating body 13. There is, however, little positional difference in the falling positions caused by a difference due to the air gap. The same can be said in the building-up position of the rectangular wave-form (e)". That is, even if there is difference in the air gap, a rotating position not affected by the effect of the air gap, or being less affected by the effect of the air gap even if affected, can be detected by employing the building-up position or the falling position which corresponds to a rear end of the projection 13*a* and where the positional difference is small.

As shown in FIG. 4(*a*), letting the interval or pitch between the falling positions of the two projections 13*a*, 13*a* of the detected rotating body 13 be $\theta_0$, an angle $\theta_1$ between the two building-up positions (in the case of the wave-form signal (e)' or between the two falling positions (in the case of the wave-form signal (e)") becomes equal to $\theta 0_o$.

In the output signal of FIG. 4(*e*)', which edge of the rectangular wave-form should be employed in order to highly accurately detect the position even if there is deviation in the air gap, the building-up edge or the falling edge, is determined depending on the polarity (N-pole or S-pole) of the magnet 12 or depending on which differential calculation circuit in the comparator 11*c* in the magneto-electric converter element 11 ((d)" or (d)") is selected. Therefore, the modification is possible.

Figure 5A:
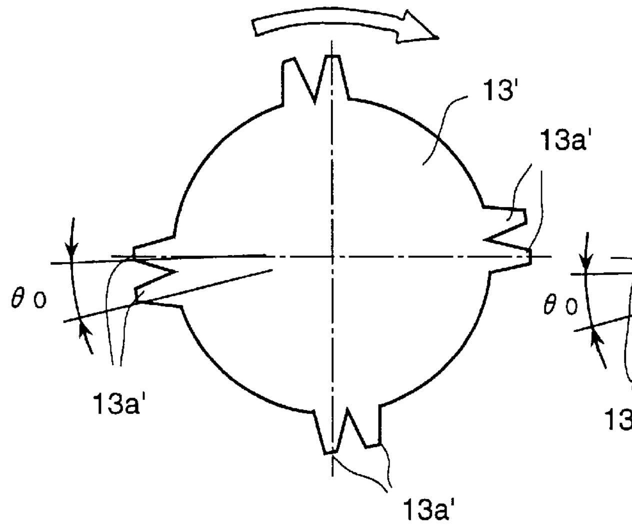
FIGS. 5A and 5B are schematically show other embodiments of detected rotating bodies of the rotating position detecting device of FIG. 1.
Figure 5B:
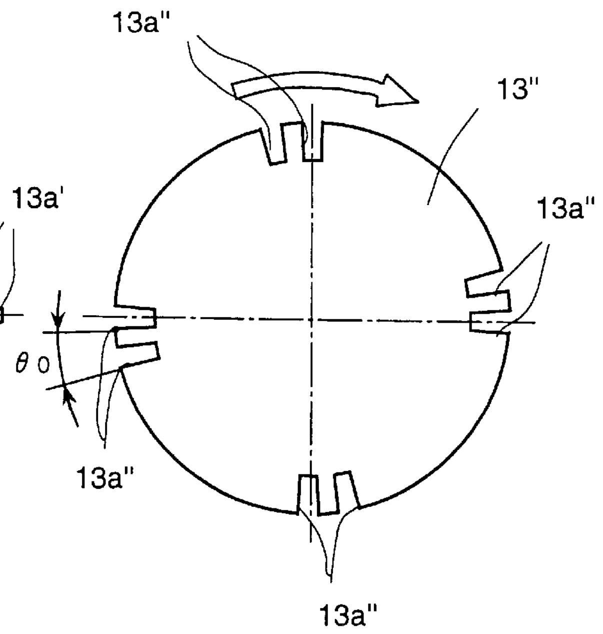

FIGS. 5 (A) and (B) show other embodiments of detected rotating bodies 13 of which shapes are modified from that of FIG. 1.

In FIG. 5 (A), four pairs of adjacent projections 13*a*', 13*a*" are arranged on the periphery of the detected rotating body 13'. In FIG. 5 (B), four pairs of adjacent grooves 13*a*", 13*a*" are arranged on the periphery of the detected rotating body 13".

Figure 5C:
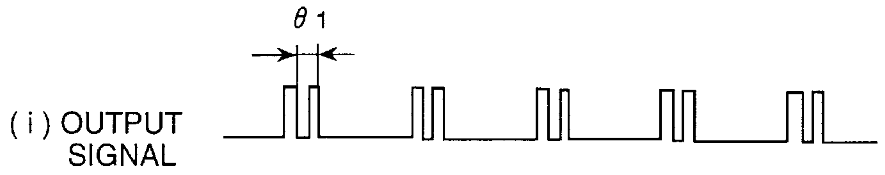
FIG. 5C is a graph of the rectangular wave-form output signal of the embodiments of FIGS. 5A and 5B.

Letting the angle between the pair of projections 13*a*", 13*a*" of the detected rotating body 13' be $\theta_0$, an output (i) of rectangular wave-form shown in FIG. 5C can be obtained by rotating the detected rotating body 13' and forming a signal of rectangular wave-form as shown in FIG. 4. In the output signal of the rectangular wave-form, a pair of adjacent rectangular wave-forms with an interval are output. Therefore, by calculating an interval angle $\theta_1$ between the falling edge portions of the pair of the rectangular wave-forms, the interval angle $\theta_1$, becomes equal to the angle $\theta_0$ between the falling portions of the pair of projections 13*a*', 13*a*'.

Figure 6:
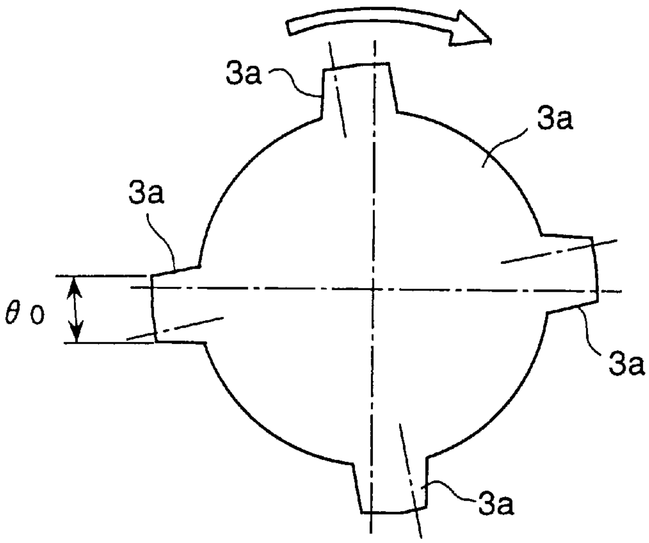
FIG. 6 (PRIOR ART)
FIG. 6 is a view showing a detected rotating body in a conventional rotating position detecting device.
Figure 7:
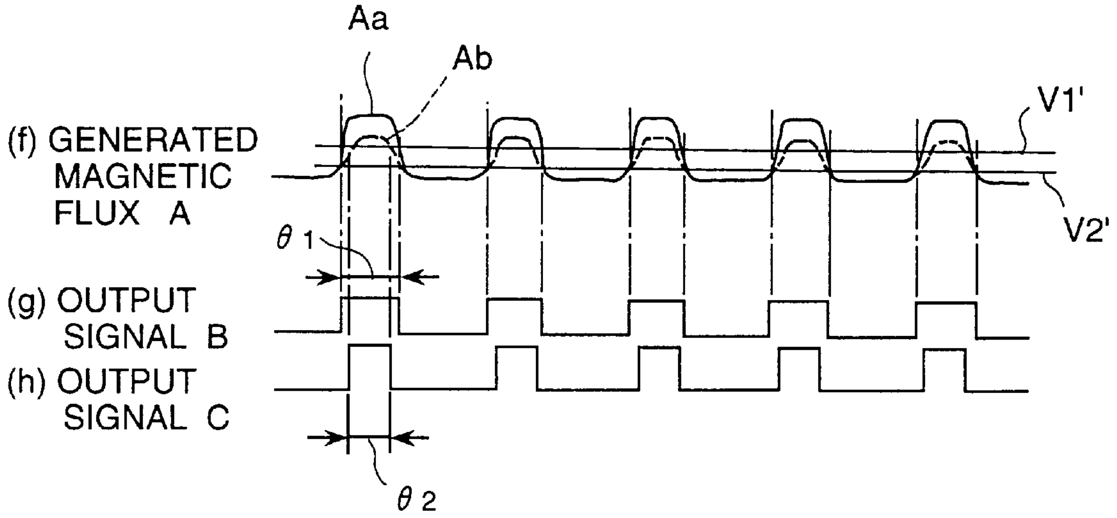
FIG. 7 (PRIOR ART)
FIG. 7 is a chart showing the concept of operation of generated magnetic flux density and output wave-form of the conventional rotating position detecting device.

Therefore, the calculation of the interval angle $\theta_1$ between the falling edge portions of the pair of the rectangular wave-forms becomes practically equivalent to the calculation of the interval angle $\theta_1$ by generating and detecting a rectangular wave-form and detecting the building-up edge portion and the falling edge portion based on the width (spacing $\theta_0$) of one projection 3*a* of the conventional detected rotating body 3 as shown in FIG. 6 and FIG. 7.

The angle $\theta_0$ between the pair of adjacent projections 13*a*', 13*a*' in the present embodiment is an angle mechanically determined. The position can be detected with high accuracy by detecting the building-up portions of the pair of rectangular wave-forms detected and generated as described above even if there is variation in the gap between the magneto-electric converter element 11 and the detected rotating body 13, i.e., the air gap, because variation of position does not occur in the falling edge portion of the detected rectangular wave-form.

Having described an embodiment of the internal combustion engine rotating position detecting device in accordance with the present invention in detail, it is to be understood that the present invention is not limited to the embodiment and that various modifications may be made in design without departing from the spirit of the present invention described in Claims.

As having described above, by utilizing an edge portion in one side (building-up or falling portion) of a generated and detected output signal of rectangular wave-form, the internal combustion engine rotating position detecting device in accordance with the present invention can accurately detect positions even if there is variation in magnetic flux amount due to the air gap.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A rotating position detecting device for an internal combustion engine, comprising a magnet for generating a magnetic field, a rotating body made of magnetic material having a plurality of projections therearound which change intensity of said magnetic field, a magnet-electric converter element having a first magnetic-sensing portion and a second magnetic-sensing portion for respectively outputting electric signals corresponding to said magnetic field, and a comparator for calculating a differential signal between said electric signal from said first magnetic-sensing portion and a said electric signal from said second magnetic-sensing portion, wherein said rotating position detecting device is configured such that said rotating position is provided based on said differential signal which is generated corresponding only to rear ends of said projections in a rotating direction of said rotating body.

2. The rotating position detecting device according to claim 1, wherein said rotating position detecting device is configured to detect said rotating position based on a falling position or a building-up position of said differential signal which is generated corresponding to said rear ends.

3. The rotating position detecting device according to claim 1, wherein said rotating position detecting device is configured to obtain an interval of said rotational position.

4. The rotating position detecting device according to claim 3, wherein said rotating position detecting device is configured to detect said interval of said rotating position based on a falling position or a building-up position of said differential signal which is generated corresponding to said rear ends.

* * * * *